(12) United States Patent
Horii et al.

(10) Patent No.: US 10,761,890 B2
(45) Date of Patent: Sep. 1, 2020

(54) OPTIMIZING MEMORY FENCES BASED ON WORKLOAD

(71) Applicant: INTERNATIONAL BUSINESS MACHINES CORPORATION, Armonk, NY (US)

(72) Inventors: Hiroshi Horii, Tokyo (JP); Hiroshi Inoue, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 15/877,737

(22) Filed: Jan. 23, 2018

(65) Prior Publication Data

US 2019/0227844 A1 Jul. 25, 2019

(51) Int. Cl.
*G06F 9/46* (2006.01)
*G06F 9/50* (2006.01)

(52) U.S. Cl.
CPC ............ *G06F 9/5016* (2013.01); *G06F 9/505* (2013.01); *G06F 9/5044* (2013.01)

(58) Field of Classification Search
CPC ....... G06F 9/5016; G06F 9/5044; G06F 9/505
See application file for complete search history.

(56) References Cited

U.S. PATENT DOCUMENTS

| 8,495,662 B2* | 7/2013 | Mannarswamy | G06F 9/526 718/100 |
| 2002/0052926 A1* | 5/2002 | Bush | G06F 8/458 709/217 |
| 2006/0031844 A1 | 2/2006 | Dice et al. | |
| 2008/0235352 A1* | 9/2008 | Yolleck | H04L 67/34 709/219 |
| 2014/0122934 A1 | 5/2014 | Wang | |

OTHER PUBLICATIONS

Spear, "Reducing Memory Ordering Overheads in Software Transactional Memory", International Symposium on Code Generation and Optimization 2009, CGO 2009, Mar. 2009, pp. 1-12.

* cited by examiner

*Primary Examiner* — Camquy Truong
(74) *Attorney, Agent, or Firm* — Tutunjian & Bitetto, P.C.; Vazken Alexanian (57) ABSTRACT

A method, computer program product, and apparatus for optimizing memory fences based on workload are provided. The method includes determining whether to execute a target program on a single hardware thread or a plurality of hardware threads. The method also includes assigning one of a light-weight memory fence and a heavy-weight memory fence as a memory fence in the target program based on whether to execute the target program on the single hardware thread or the plurality of hardware threads. The method further includes assigning the light-weight memory fence in response to determining to execute the target program on the single hardware thread, and the heavy-weight memory fence is assigned in response to determining to execute the target program on the plurality of hardware threads.

20 Claims, 8 Drawing Sheets

OPTIMIZING MEMORY FENCES BASED ON WORKLOAD

BACKGROUND

Technical Field

The present invention relates to memory fences. More specifically, the present invention relates to optimizing memory fences based on workload.

Description of the Related Art

Recently, many processors adopt a relaxed memory model, which allows out-of-order execution and asynchronous propagation of memory accesses. Such processors can efficiently execute memory accesses by completing some memory accesses before completing preceding memory accesses in program order if it takes a longer time to perform the preceding memory accesses.

Such processors have memory fence instructions (or memory barrier instructions) that guarantee that every memory access or every memory access of a special type (e.g. load and store) preceding the memory fence instructions in program order is performed before allowing any memory access or any memory access of the special type following the memory fence instructions in program order. For example, memory fence instructions are used when the result of the preceding memory accesses must be guaranteed to propagate to the subsequent memory accesses.

However, a memory fence instruction can be computationally expensive (i.e. long latency), especially if it guarantees every memory access or every memory access of a special type preceding the memory fence instruction in program order is globally performed in a computer system having many processors, many cores, or many hardware threads.

SUMMARY

According to an embodiment of the present invention, provided is a computer-implemented method including determining whether to execute a target program on a single hardware thread or a plurality of hardware threads, and assigning one of a light-weight memory fence and a heavy-weight memory fence as a memory fence in the target program based on whether to execute the target program on the single hardware thread or the plurality of hardware threads, wherein the light-weight memory fence is assigned in response to determining to execute the target program on the single hardware thread, and the heavy-weight memory fence is assigned in response to determining to execute the target program on the plurality of hardware threads.

Related embodiments may also include a computer program product including one or more computer readable storage mediums collectively storing program instructions that are executable by a computer to cause the computer to perform the method, and an apparatus that performs the method.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
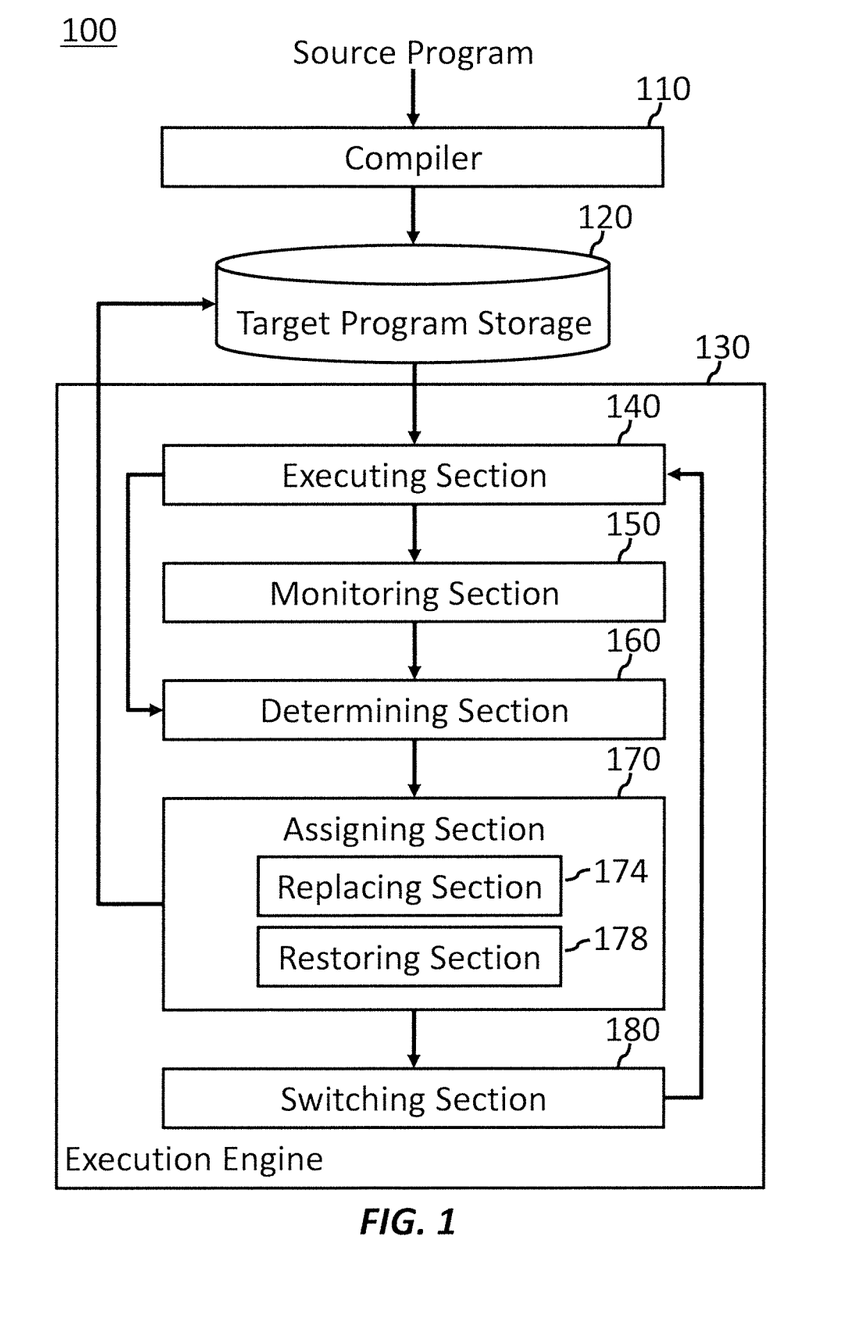
FIG. 1 shows an apparatus for executing a source program, according to an embodiment of the present invention.

FIG. 1 shows an apparatus 100 for executing a source program, according to an embodiment of the present invention. Apparatus 100 may be a personal computer or a client computer such as a desktop computer, a portable computer, a tablet computer, or a smartphone. Apparatus 100 may also be a server computer or a host computer such as a business server, an engineering server, or a mainframe computer.

Apparatus 100 may receive a source program, compile the source program to obtain a target program, and execute the target program. The source program may be written in a programming language such as Java®, C++, and so on. The source program may also be a virtual-machine code such as Java Virtual Machine (JVM) code or Java byte code, an assembly code, or any other intermediate code, or a machine language code. In the following explanations, the source program is a JVM code and the target program is a machine language code in order to make the embodiments more easily understandable. However, other programming languages may be used. (Java is a registered trademark of Oracle.)

Apparatus 100 includes compiler 110, target program storage 120, and execution engine 130. Apparatus 100 may include, as hardware, at least one processor or programmable circuitry and one or more computer readable mediums collectively including instructions that, when executed by the processor or the programmable circuitry, cause the processor to perform operations or functions of compiler 110, target program storage 120, and execution engine 130. In other implementations, at least part of compiler 110, target program storage 120, and execution engine 130 may be implemented on a dedicated hardware circuit or programmable circuitry.

Apparatus 100 includes a plurality of hardware threads, and apparatus 100 can execute a plurality of software threads in parallel. For example, apparatus 100 may include at least one multithreading processor or at least one multicore processor each of which includes two or more hardware threads. Alternatively, apparatus 100 may include a plurality of processors each having a single hardware thread. Each hardware thread may include a portion of executing one software thread in a multithreading processor or a multi-threading processor core, or a single processor or single core that can execute one software thread. Each hardware thread can execute one software thread at a time, and may switch the current software thread between two or more software threads to execute the two or more software threads concurrently.

Compiler 110 may receive a source program written in a programming language, such as JVM code as an example. Compiler 110 compiles the source program and outputs a target program, such as a machine language code as an example, to be executed by execution engine 130. Compiler 110 may compile the entire source program before execution engine 130 starts executing the compiled target program. In other implementations, compiler 110 may be a JIT (Just-In-Time) compiler that compiles each portion of the source program while execution engine 130 executes the target program. A JIT compiler may compile each portion of the source program just before executing the portion or may compile it on a separate thread without interrupting the target program execution such that the compilation of the source program and the execution of the target program in execution engine 130 can be overlapped or concurrently executed. In addition, a JIT compiler may re-compile each portion of the source program by using profiles about the execution of the target program at runtime.

Compiler 110 may compile the source program to the target program including a plurality of instructions for software threads that can be executed on a plurality of hardware threads. Compiler 110 may place a memory fence at one or more locations in the instruction code for one or more software threads. For example, compiler 110 may insert a memory fence if write data of a memory store instruction from one software thread must be propagated to another software thread, or if a memory load instruction of one software thread must read memory data before the memory data is overwritten by other software threads executed afterward. In some processor implementations, compiler 110 may insert a memory fence even if write data of a memory store instruction must be propagated to subsequent memory load instructions within the same software thread. In this application, "memory fence" may be a single instruction or a sequence of instructions that collectively perform a memory fence. Both implementations of a memory fence are also referred as "memory fence instruction" in this application.

In this embodiment, compiler 110 may place a heavy-weight memory fence (also referred as "HW memory fence" or "HW mfence") as a memory fence. A HW memory fence instruction may be configured to guarantee that every memory access of a predetermined type preceding the HW memory fence in program order is globally visible in the plurality of hardware threads before allowing any memory access of the predetermined type following the HW memory fence in program order. The predetermined type may be all types, almost all types, load and store, load and store to a memory space having a cacheable attribute, or any type that can guarantee the software threads in the target program correctly executed on a plurality of hardware threads in parallel. For example, a processor based on POWER architecture may not guarantee this memory access order by a sync instruction if the preceding memory access is caused by an icbi (instruction cache block invalidate) instruction. Since writing a self-modifying code is generally avoided, this exception may not become a problem in using a sync instruction as a HW memory fence instruction of the target program. If the target program includes a self-modifying code, then a pair of sync and isync instructions can be used as a HW memory fence instruction. Hereinafter, "of the predetermined type" may be omitted when referring "memory access" or "memory access instruction." For example, "every/any memory access" does not necessarily mean every/any memory access among all memory access instructions in the instruction set of the processor included in apparatus 100.

In one implementation, the hardware thread that executes a HW memory fence may wait until all memory accesses preceding the HW memory fence in program order are preformed or completed, and then completes the HW memory fence. The hardware thread may not start issuing any memory accesses following the HW memory fence in program order before the HW memory fence is completed. By using heavy-memory fences as memory fences in the target program, compiler 110 can generate a target program that can be executed in multiple hardware threads.

Target program storage 120 is connected (wired or wirelessly) to compiler 110. Target program storage 120 may be a volatile memory such as DRAM or SRAM, a non-volatile memory such as flash memory, or an external storage device such as a hard disk. Target program storage 120 may receive the target program from compiler 110 and store the target program.

Execution engine 130 is connected to target program storage 120. Execution engine 130 may read the target program from target program storage 120 and executes the target program. Execution engine 130 may include a virtual machine monitor, such as a JVM (Java Virtual Machine) monitor, that executes and manages execution of the target program. In some implementations, execution engine 130 may include, as hardware, one or more processors, memory, one or more memory controllers, and other peripheral circuitry that executes the target program written in a machine language including machine instructions for the one or more processors. Execution engine 130 may include executing section 140, monitoring section 150, determining section 160, assigning section 170 and switching section 180.

Executing section 140 may execute the target program stored in target program storage 120. Since the target program originally includes HW memory fences, executing section 140 may start executing the target program on a plurality of hardware threads. However, if it is determined to execute the target program on a single hardware thread, then executing section 140 executes the target program on the single hardware thread.

Monitoring section 150 may monitor an execution workload of the target program. Monitoring section 150 may also monitor a frequency of executing each of one or more memory fences in the target program. Apparatus 100 may execute monitoring section 150 on one or more software threads that are different from the software threads for the target program so that apparatus 100 can execute software monitoring thread(s) concurrently or in parallel with the target program.

Determining section 160 may determine whether to execute a target program on a single hardware thread or a plurality of hardware threads. Determining section 160 may determine this based on the result of the monitoring by monitoring section 150. Apparatus 100 may execute determining section 160 on one or more software threads that are different from the software threads for the target program.

Assigning section 170 may assign one of a light-weight memory fence and a HW memory fence as a memory fence in the target program based on whether to execute the target program on the single hardware thread or the plurality of hardware threads. Apparatus 100 may execute assigning section 170 on one or more software threads that are different from the software threads for the target program.

A light-weight memory fence (also referred as "LW memory fence" or "LW mfence") may be less computationally expensive than a HW memory fence, but it does not guarantee the memory access order in the same manner as a HW memory fence does. A LW memory fence may be configured to guarantee that every memory access of a predetermined type preceding the LW memory fence in program order is locally visible in the single hardware thread before allowing any memory access of the predetermined type following the LW memory fence in program order. The predetermined type may be all types, almost all types, load and store, load and store to a memory space having a cacheable attribute, or any type that can guarantee that the software threads in the target program are correctly executed on a single hardware thread. Since the LW memory fence may not guarantee the global visibility of preceding memory accesses, processors can propagate the preceding memory accesses and the subsequent memory accesses to other hardware threads in any order. This removes ordering restrictions between the preceding and subsequent memory accesses, and may be resolved within the hardware thread (or a core/processor).

Assigning section 170 may assign a LW memory fence in response to determining to execute the target program on the single hardware thread. In this embodiment, assigning section 170 includes replacing section 174 that assigns a LW memory fence as a memory fence in the target program by replacing a HW memory fence instruction in the target program with a LW memory fence instruction.

Assigning section 170 may also assign a HW memory fence in response to determining to execute the target program on the plurality of hardware threads. In this embodiment, compiler 110 originally places a HW memory fence as a memory fence in the target program, but the HW memory fence can be replaced with a LW memory fence by replacing section 174. Therefore, assigning section 170 also includes restoring section 178 that assigns a HW memory fence as a memory fence in the target program by restoring, after the target program is executed on the single hardware thread, the HW memory fence instruction in the target program in response to determining to execute the target program on a plurality of hardware threads. This dynamic assignment of the HW memory fence and LW memory fence will enhance the functionality of the processor running the target program by best utilizing the resources of the processor while executing the target program. With HW memory fences more efficiently running on a plurality of hardware threads and the LW memory fences more efficiently running on a single hardware threads.

Switching section 180 may switch execution of the target program between execution on the single hardware thread and execution on the plurality of hardware threads. Switching section 180 may switch execution of the target program during temporary suspension of execution of the target program.

Figure 2:
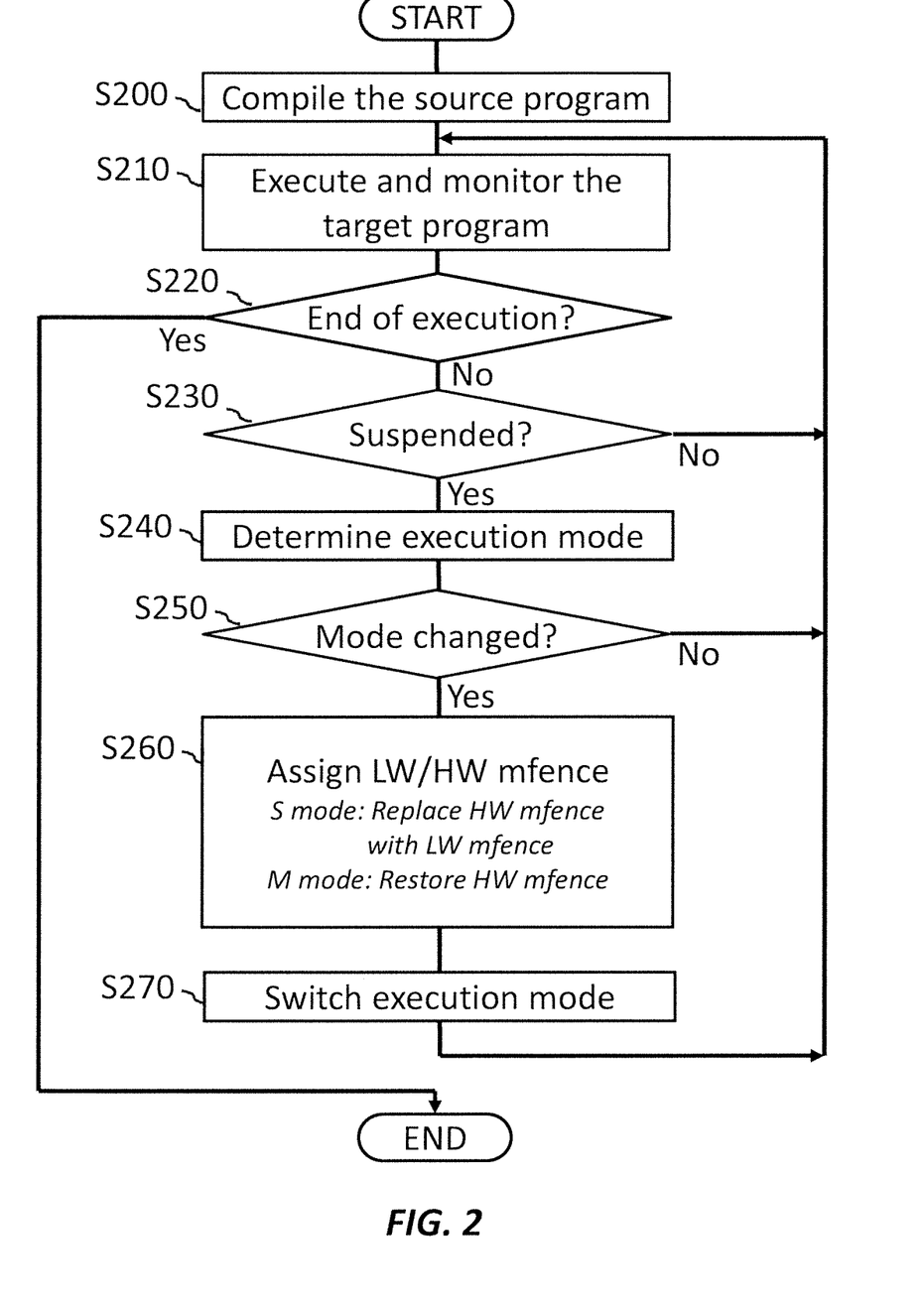
FIG. 2 shows an operational flow for executing a source program, according to an embodiment of the present invention.

FIG. 2 shows an operational flow for executing a source program, according to an embodiment of the present invention. The operations of FIG. 2 can be performed by, for example, apparatus 100 and its components that were explained in reference to FIG. 1. While the operational flow of FIG. 2 will be explained in reference to apparatus 100 and its components, the operational flow can be performed by other apparatus having different components as well.

At S200 (Step 200), compiler 110 receives a source program, and compiles the source program to obtain a target program. Compiler 110 stores the target program in target program storage 120.

At S210, executing section 140 executes the target program stored in target program storage 120. During execution of the target program, monitoring section 150 may monitor an execution workload of the target program and a frequency (e.g. interval or count of execution) of execution of each memory fence of the target program.

At S220, executing section 140 finishes executing the target program if the execution reaches an end of execution in the target program (Yes in S220). At S230, determining section 160 checks whether the execution of the target program is suspended by checking whether all software threads of the target program have temporarily stopped execution. Apparatus 100 proceeds to S210 if all software threads of the target program have not stopped execution (No in S230). In some implementations, such as JVM, this temporary suspension of execution of the target program may be caused by a garbage collection. In garbage collection, apparatus 100 collects unused memory spaces and reassigns memory spaces to variables in the target program. Since software threads cannot be correctly executed if the memory allocation is changed during execution, apparatus 100 stops executing any software threads before a garbage collection.

At S240, determining section 160 determines the execution mode by determining whether to execute the target program on a single hardware thread ("S" or "Single" mode) or a plurality of hardware threads ("M" or "Multiple" mode). For example, determining section 160 may determine whether to execute the target program on the single hardware thread or the plurality of hardware threads based on the execution workload monitored in S210. In some implementations, determining section 160 may determine to execute the target program on the single hardware thread in response to the execution workload being lower than a first threshold. This first threshold may not be more than a processing capacity of the single hardware thread. By using this determination, determining section 160 can determine to execute the target program on the single hardware thread as long as the single hardware thread has enough processing capacity to execute all of the software threads of the target program.

In some implementations, determining section 160 may determine to execute the target program on the plurality of hardware threads in response to the execution workload not being lower than a second threshold. This second threshold can be less than a processing capacity of the single hardware thread. In this case, determining section 160 can determine to execute the target program on a plurality of hardware threads before 100% processing capacity of the single hardware thread is consumed. Alternatively, this second threshold can be equal to or more than a processing capacity of the single hardware thread. In this case, determining section 160 can determine to execute the target program on a plurality of hardware threads if the target program actually requires a processing capacity of more than one hardware thread. To give hysteresis to the condition of switching the execution mode, the second threshold can be more than the first threshold.

In some implementations, determining section 160 may determine whether to execute the target program on a single hardware thread or a plurality of hardware threads based on other conditions. For example, determining section 160 may determine to transit some or almost all of the hardware threads to a sleep state to reduce power consumption. In this case, determining section 160 may determine to execute the target program on a single hardware thread. Determining section 160 may also determine to transit some or almost all of the hardware threads from a sleep state to an active state to increase the total processing capacity of apparatus 100. In this case, determining section 160 may determine to execute the target program on a plurality of hardware threads.

At S250, apparatus 100 proceeds to S210 if the execution mode is determined to be unchanged (No in S250).

At S260, assigning section 170 assigns one of a LW memory fence and a HW memory fence as a memory fence in the target program based on whether to execute the target program on the single hardware thread or the plurality of hardware threads. In case determining section 160 has determined to change the execution mode to "S" mode, assigning section 170 may replace one or more HW memory fence instructions in the target program with LW memory fence instructions. Assigning section 170 may replace all HW memory fence instructions with LW memory fence instructions. Alternatively, assigning section 170 can replace each HW memory fence instruction with a LW memory fence instruction subject to a condition that the corresponding memory fence exceeds a threshold number of executions or frequency of execution. Assigning section 170 may record every memory location of the HW memory fence replaced with a LW memory fence.

In response to determining section 160 determining to change the execution mode to "M" mode, assigning section 170 may restore the HW memory fence instruction replaced with the LW memory fence instruction. Assigning section 170 may restore all the replaced HW memory fence instructions to guarantee the correct execution on the plurality of hardware threads. Assigning section 170 may restore all replaced HW memory fences with reference to recorded memory locations of the HW memory fences.

At S270, switching section 180 switches execution of the target program between execution on the single hardware thread and execution on the plurality of hardware threads as determined by determining section 160. Switching section 180 may set a processor affinity of software threads of the target program to the single hardware thread in response to determining to execute the target program on the single hardware thread. By setting the processor affinity, switching section 180 may force all software threads to be executed on the single hardware thread. In this case, switching section 180 may clear the processor affinity in response to determining to execute the target program on the plurality of hardware threads. Apparatus 100 proceeds to S240 to continue to execute the target program which was temporarily suspended.

In this embodiment, apparatus 100 can replace HW memory fences with LW memory fences if it is determined to execute the target program on a single hardware thread. Since LW memory fences do not need to guarantee global visibility of preceding memory access instructions, apparatus 100 can execute the target program more efficiently than executing the target program without replacing the HW memory fences with LW memory fences.

Furthermore, apparatus 100 can replace HW memory fences originally inserted by compiler 110 with LW memory fences. Therefore, it may be possible to use existing compilers that generate a compiled code for multiple hardware threads as compiler 110 to prepare the target program.

In other embodiments, S240 and S250 can be performed during performance of S210 or between S210 and S220. In this case, determining section 160 periodically checks the monitoring result of determining section 160, and determines the next execution mode. If determining section 160 determines to change the execution mode, determining section 160 requests executing section 140 to suspend the target program.

Figure 3:
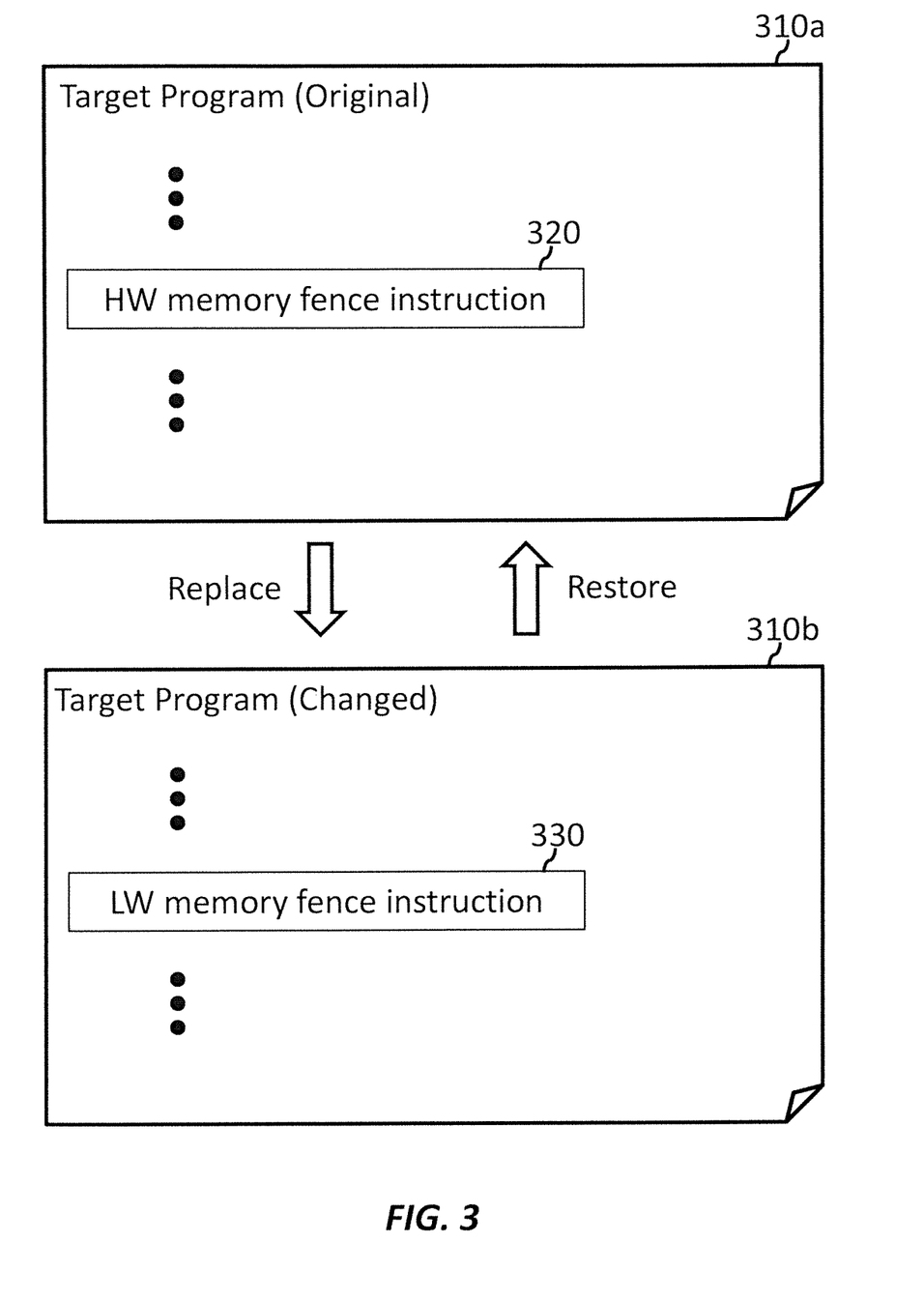
FIG. 3 shows an example of replacing and restoring a heavy-weight memory fence in a target program, according to an embodiment of the present invention.

FIG. 3 shows an example of replacing and restoring a HW memory fence in a target program, according to an embodiment of the present invention.

Compiler 110 originally generates target program 310a including HW memory fence instruction 320 as a memory fence (at S200 in FIG. 2). Replacing section 174 converts target program 310a to target program 310b by replacing HW memory fence instruction 320 with LW memory fence instruction 330 in response to determining to execute the target program on a single hardware thread (at S260 in FIG. 2). Restoring section 178 converts target program 310b to target program 310a by restoring HW memory fence instruction 320 in response to determining to execute the target program on a plurality of hardware threads (at S260 in FIG. 2).

In case apparatus 100 includes one or more POWER processors, HW memory fence instruction 320 can be a sync (sync 0) instruction that guarantees every memory access preceding the sync instruction in program order is globally visible before allowing any memory accesses following the sync instruction in program order (except for icbi instruction as the preceding instruction). LW memory fence instruction 330 can be a lightweight sync or lwsync (sync 1) that guarantee every memory access preceding the lwsync instruction in program order is locally visible before allowing any memory accesses following the lwsync instruction in program order. In the POWER architecture, lwsync instruction can only be useful in ordering memory accesses to memory locations specified as "Memory Coherence Required," and it is not effective for a store or dcbz (data cache block set to 0) instruction as the preceding instruction and a load instruction as the subsequent instruction. However, lwsync can still be used as a LW memory fence instruction in situations in which "Memory Coherence Required" is specified to memory areas allocated to software threads of the target program. Lwsync can guarantee global visibility of pairs of (preceding) load and (subsequent) load, load and store, and store and store to cacheable memory locations. If the POWER processor in apparatus 100 guarantees, as an implementation, preceding stores to be locally visible to subsequent loads, then lwsync can guarantee together with restrictions of the implementation, local visibility of a preceding load and store to a subsequent load and store. For example, if an implementation of POWER processor allows a write buffer, which temporarily contains write data from preceding store instructions, to forward the write data to a subsequent load instruction for the same memory address, all preceding stores become locally visible to subsequent loads.

In some implementations, the processor executing the target program is configured to guarantee that every memory access (of a predetermined type) is locally visible in the single hardware thread before any subsequent memory accesses (of a predetermined type) in program order are performed. In response to this condition, replacing section 174 can replace the HW memory fence instruction with a non-operation or nop as a LW memory fence. By replacing a HW memory fence with a nop, apparatus 100 can minimize latencies of memory fences in the target program if apparatus 100 determines to execute the target program in a single hardware thread.

In some implementations, apparatus 100 may originally generate the target program including a LW memory fence as a memory fence. In this case, replacing section 174 may replace the LW memory fence instruction in the target program with a HW memory fence instruction in response to determining to execute the target program on the plurality of hardware threads. Restoring section 178 may restore the LW memory fence instruction in the target program in response to determining to execute the target program on a single hardware thread after the target program is executed on a plurality of hardware threads.

In some implementations, determining section 160 may determine whether to execute the target program on a single hardware thread or a plurality of hardware threads only once. In this case, assigning section 170 may assign one of a LW memory fence and a HW memory fence as a memory fence in the target program based on the decision of determining section 160, and then executing section 140 may start executing the target program.

Figure 4:
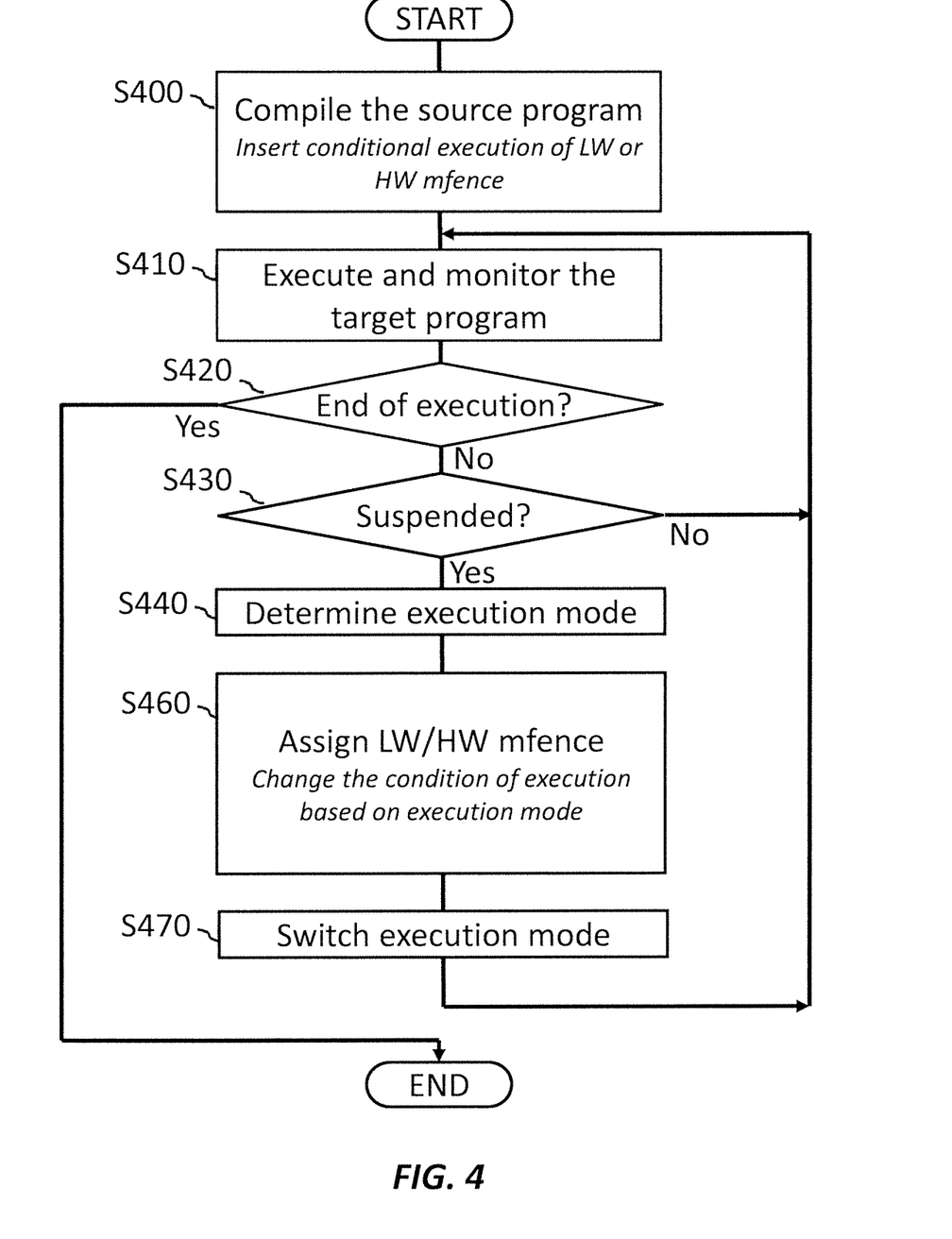
FIG. 4 shows an operational flow for executing a source program, according to an embodiment of the present invention.

FIG. 4 shows an operational flow for executing a source program, according to an embodiment of the present invention. The operations of FIG. 4 can be performed by, for example, apparatus 100 and its components that were explained in reference to FIG. 1. Since the operational flow of FIG. 4 does not include operations relating to replacing section 174 and restoring section 178, assigning section 170 does not need to include replacing section 174 and restoring section 178. While the operational flow of FIG. 4 will be explained in reference to apparatus 100 and its components, the operational flow can be performed by other apparatus having different components as well.

The operational flow of FIG. 4 is a variation of the operational flow of FIG. 2. Hereinafter, only the differences from the operational flow of FIG. 2 are explained, and any other explanations of the operational flow of FIG. 2 can also generally be applied to the operational flow of FIG. 4.

At S400, compiler 110 receives a source program, and compiles the source program to obtain a target program. In this embodiment, compiler 110 inserts, to the target program, a code for conditionally ("M" mode) executing a HW memory fence as a memory fence. The code may otherwise ("S" mode) execute a LW memory fence as the memory fence. If apparatus 100 starts executing the target program on a plurality of hardware threads, the condition is preset to true ("M" mode) so that the code is preset to execute the HW memory fence as the memory fence. S410 to S440 are generally same as S210 to S240 in FIG. 2.

At S460, assigning section 170 assigns one of a LW memory fence and a HW memory fence as a memory fence in the target program based on whether to execute the target program on the single hardware thread or the plurality of hardware threads. In response to determining section 160 determining to change the execution mode to "M" mode, assigning section 170 may set the condition of the code to execute the HW memory fence. In response to determining section 160 determining to change the execution mode to "S" mode, assigning section 170 may set the condition of the code to execute the LW memory fence. S470 is generally the same as S270 in FIG. 2.

In this embodiment, compiler 110 inserts code for conditionally executing a HW memory fence as a memory fence in the target program. If the target program has a plurality of memory fences, then compiler 110 inserts this code for at least one of the memory fences, and compiler 110 may generate HW memory fences as the remaining memory fences. In this embodiment, apparatus 100 can easily assign one of a HW memory fence and a LW memory fence as a memory fence by changing the condition.

Figure 5:
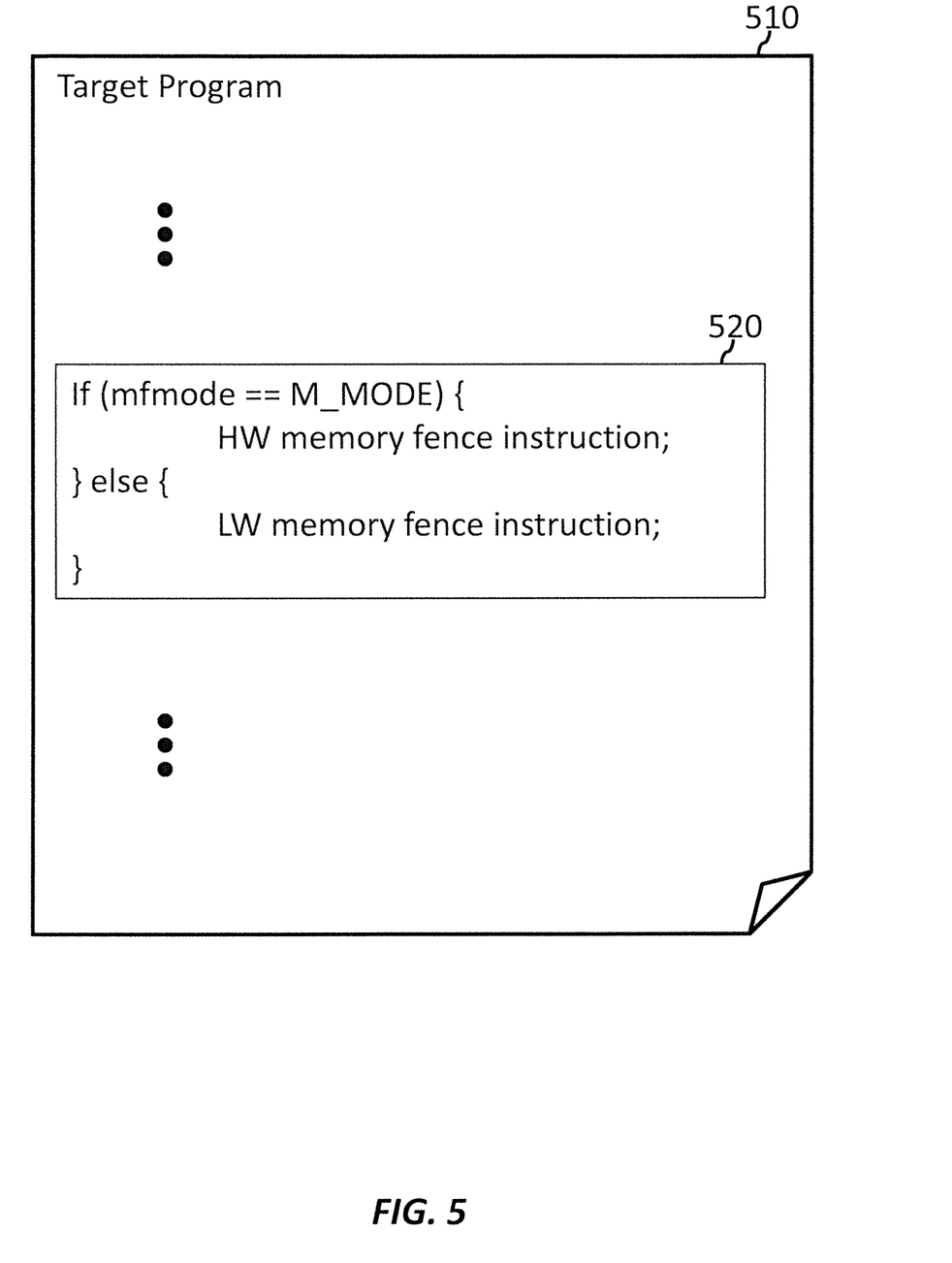
FIG. 5 shows an example of inserting a code for conditionally executing a heavy-weight fence in a target program, according to an embodiment of the present invention.

FIG. 5 shows an example of inserting a code for conditionally executing a HW fence in a target program, according to an embodiment of the present invention. The target program of this embodiment may be a machine language code. However, to increase the readability of the code in the specification and figures, the code in FIG. 5 is described in Java language style.

Compiler 110 compiles the source program to obtain target program 510 at S400 in FIG. 4. Target program 510 includes code 520 for conditionally executing a HW memory fence as a memory fence in the target program, and otherwise executing a LW memory fence. In target program 510, the execution mode is stored in a variable mfmode. The variable mfmode, which represents the execution mode, may be a flag that takes a value 0 (e.g. "S" mode) or a value 1 (e.g. "M" mode). During execution of target program 510, apparatus 100 checks whether or not the execution mode is in "M" mode ("mfmode==M_MODE", M_MODE is a constant value 1 that represents "M" mode). If mfmode is equal to M_MODE, then a HW memory fence instruction is executed, and otherwise a LW memory fence instruction is executed.

Figure 6:
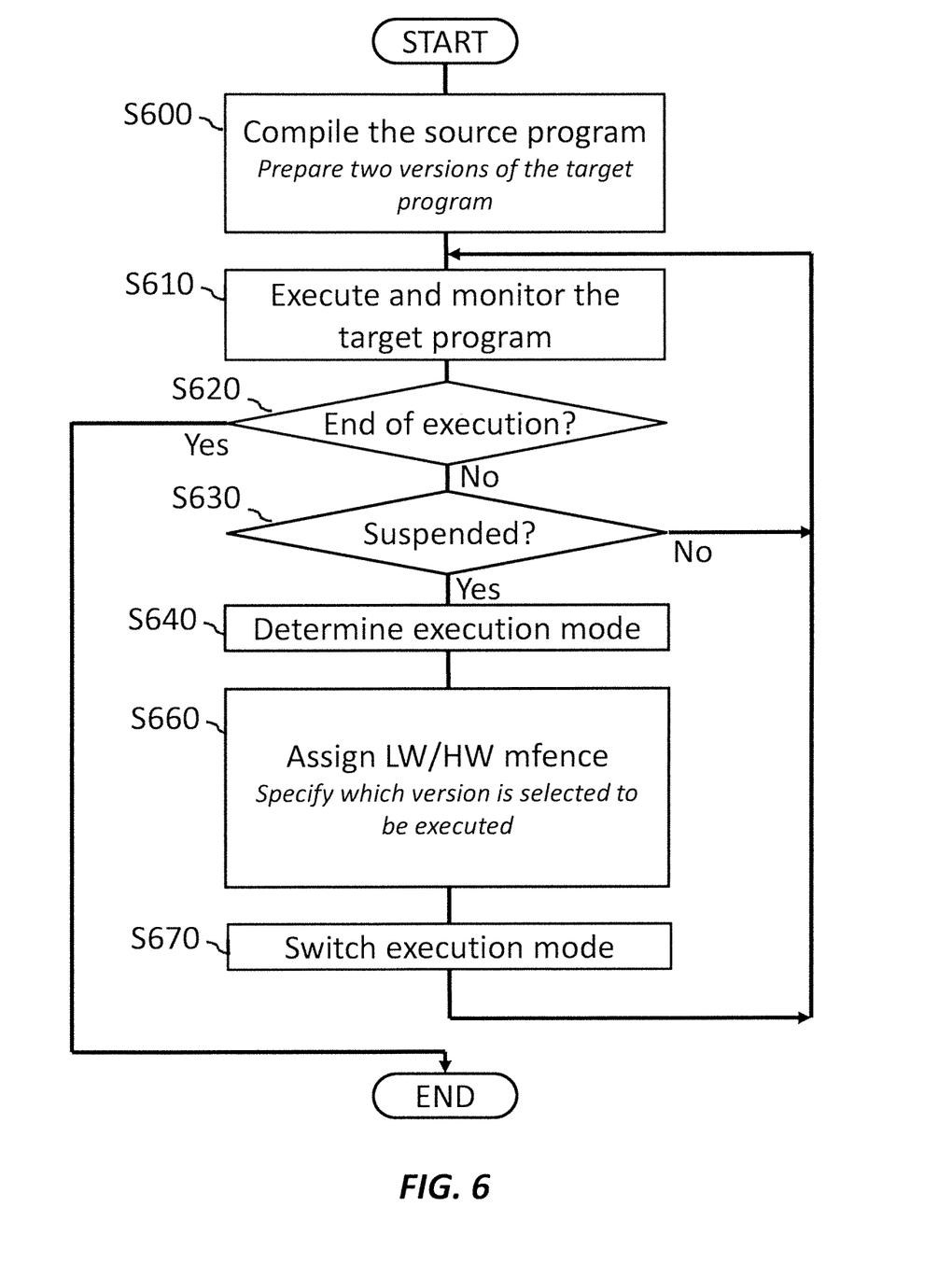
FIG. 6 shows an operational flow for executing a source program, according to an embodiment of the present invention.

FIG. 6 shows an operational flow for executing a source program, according to an embodiment of the present invention. The operations of FIG. 6 can be performed by, for example, apparatus 100 and its components that were explained in reference to FIG. 1. Since the operational flow of FIG. 6 does not include operations relating to replacing section 174 and restoring section 178, assigning section 170 does not need to include replacing section 174 and restoring section 178. While the operational flow of FIG. 6 will be explained in reference to apparatus 100 and its components, the operational flow can be performed by other apparatus having different components as well.

The operational flow of FIG. 6 is a variation of the operational flow of FIG. 2. Hereinafter, only the differences from the operational flow of FIG. 2 are explained, and any other explanations of the operational flow of FIG. 2 can also generally be applied to the operational flow of FIG. 6.

At S600, compiler 110 receives a source program, and compiles the source program to obtain a target program. In this embodiment, compiler 110 prepares a first version (a version for "M" mode) of the target program including the HW memory fence and a second version (a version for "S" mode) of the target program including the LW memory fence.

At S610, executing section 140 executes the target program stored in target program storage 120. If the execution mode is "M" mode, then executing section 140 executes the target program on a plurality of hardware threads by fetching instructions from the first version of the target program. If the execution mode is "S" mode, then executing section 140 executes the target program on a single hardware thread by fetching instructions from the second version of the target program. S620 to S640 are generally the same as S220 to S240 in FIG. 2.

At S660, assigning section 170 assigns one of a LW memory fence and a HW memory fence as a memory fence in the target program based on whether to execute the target program on the single hardware thread or the plurality of hardware threads. In response to determining section 160 determining to change the execution mode to "M" mode, assigning section 170 may specify that the first version of the target program is selected to be executed. In response to determining section 160 determining to change the execution mode to "S" mode, assigning section 170 may specify that the second version of the target program is selected to be executed.

Figure 7:
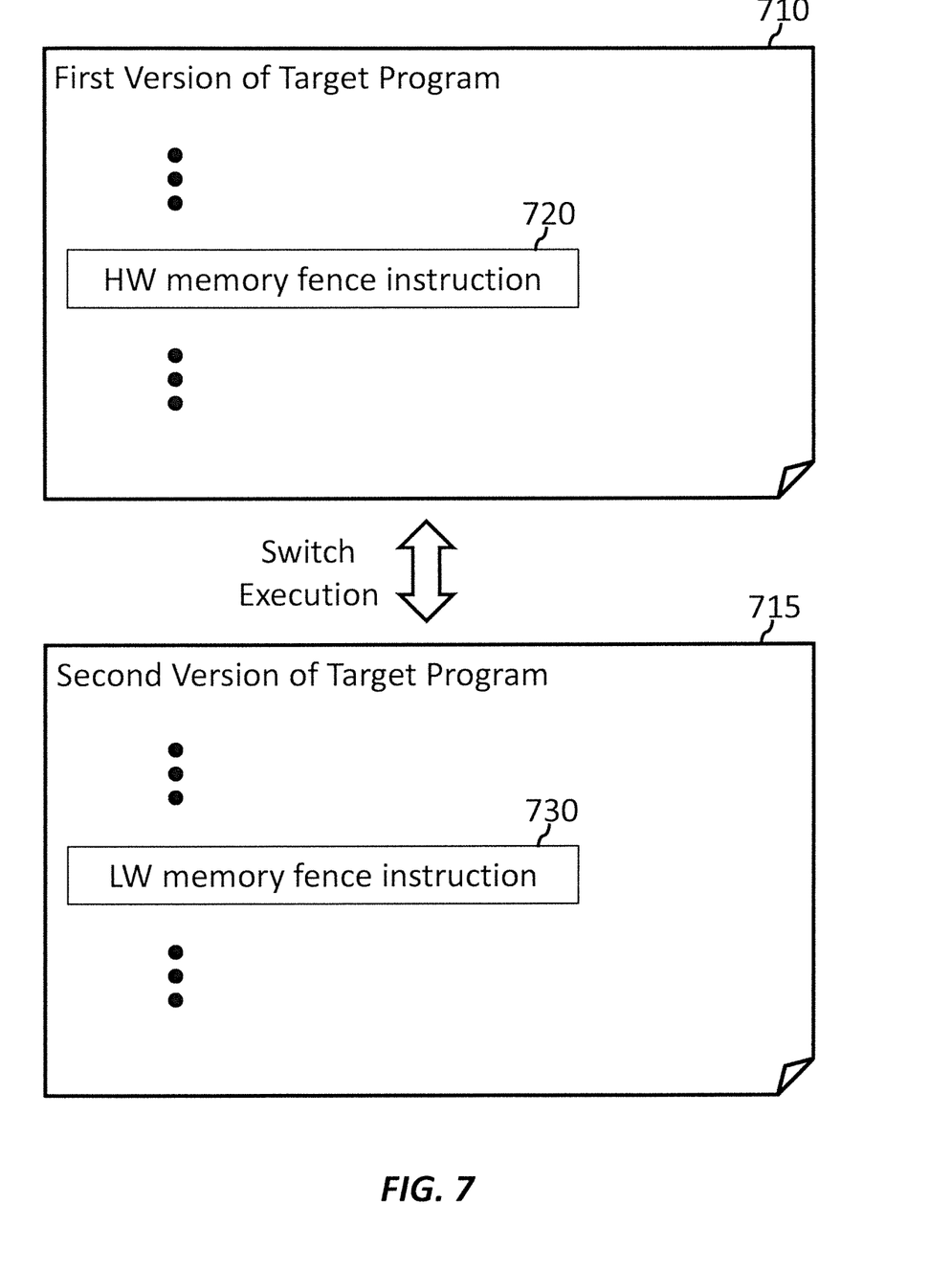
FIG. 7 shows an example of preparing a plurality of versions of a target program, according to an embodiment of the present invention.

At S670, switching section 180 switches execution of the target program between execution on the single hardware thread and execution on the plurality of hardware threads as determined by determining section 160. If the execution mode is changed from "M" mode to "S" mode, then switching section 180 continues execution of each software thread of the target program from an instruction address in the second version of the target program that corresponds to the next instruction address in the first version of the target program. If the execution mode is changed from "S" mode to "M" mode, switching section 180 continues execution of each software thread of the target program from an instruction address in the first version of the target program that corresponds to the next instruction address in the second version of the target program. Executing section 140 may use the common data memory space for first version of the target program 710 and second version of the target program 715 so that switching section 180 does not need to copy all variables between the first and second version of the target program.

FIG. 7 shows an example of preparing a plurality of versions of a target program, according to an embodiment of the present invention.

Compiler 110 compiles the source program to obtain first version of the target program 710 and second version of the target program 715 (at S600 in FIG. 6). First version of the target program 710 includes HW memory fence instruction 720 as a memory fence. Second version of the target program 715 includes LW memory fence instruction 730 as a memory fence.

If the execution mode is in "M" mode, then executing section 140 executes first version of the target program 710 on a plurality of hardware threads (at S610 in FIG. 6). If the execution mode is in "S" mode, executing section 140 executes second version of the target program 715 on a single hardware thread (at S610 in FIG. 6). If the execution mode is changed, then switching section 180 switches execution of the target program between first version of the target program 710 and second version of the target program 715.

In this embodiment, compiler 110 may prepare two versions of the target program. If compiler 110 has an option for selecting one of a HW memory fence and a LW memory fence as a memory fence in the target program, compiler 110 can prepare two versions by executing compilation two times with different option settings. In this embodiment, apparatus 100 can assign one of a HW memory fence and a LW memory fence as every memory fence by switching the execution between the first version of the target program and the second version of the target program.

Figure 8:
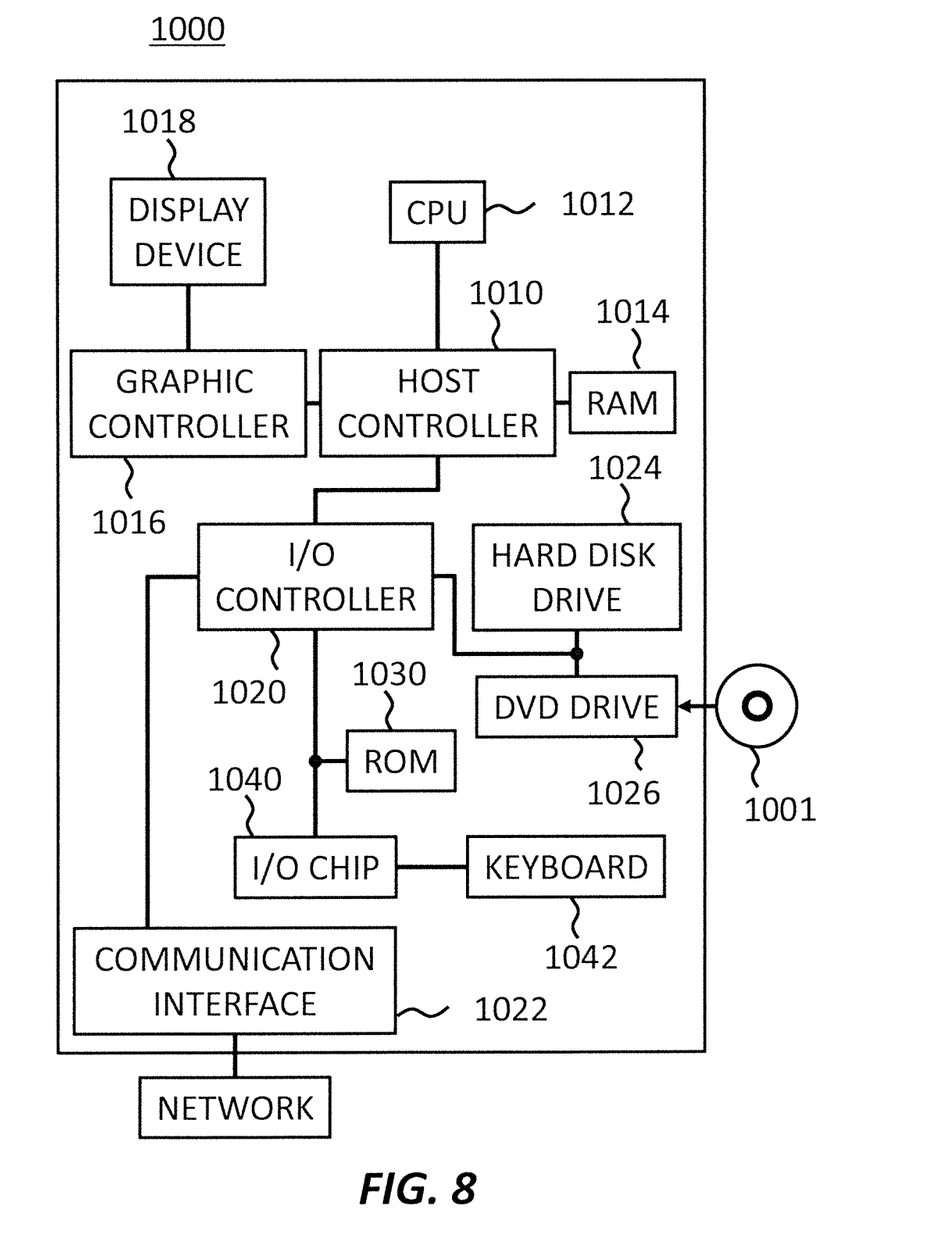
FIG. 8 shows an exemplary hardware configuration of a computer configured for executing a source program, according to an embodiment of the present invention.

FIG. 8 shows an exemplary hardware configuration of a computer configured to perform the foregoing operations, according to an embodiment of the present invention. A program that is installed in the computer 1000 can cause the computer 1000 to function as or perform operations associated with apparatuses of the embodiments of the present invention or one or more sections (including modules, components, elements, etc.) thereof, and/or cause the computer 1000 to perform processes of the embodiments of the present invention or steps thereof. Such a program may be executed by the CPU 1012 to cause the computer 1000 to perform certain operations associated with some or all of the blocks of flowcharts and block diagrams described herein.

The computer 1000 according to the present embodiment includes a CPU 1012, a RAM 1014, a graphics controller 1016, and a display device 1018, which are mutually connected by a host controller 1010. The computer 1000 also includes input/output units such as a communication interface 1022, a hard disk drive 1024, a DVD-ROM drive 1026 and an IC card drive, which are connected to the host controller 1010 via an input/output controller 1020. The computer also includes legacy input/output units such as a ROM 1030 and a keyboard 1042, which are connected to the input/output controller 1020 through an input/output chip 1040.

The CPU 1012 operates according to programs stored in the ROM 1030 and the RAM 1014, thereby controlling each unit. The graphics controller 1016 obtains image data generated by the CPU 1012 on a frame buffer or the like provided in the RAM 1014 or in itself, and causes the image data to be displayed on the display device 1018.

The communication interface 1022 communicates with other electronic devices via a network 1050. The hard disk drive 1024 stores programs and data used by the CPU 1012 within the computer 1000. The DVD-ROM drive 1026 reads the programs or the data from the DVD-ROM 1001, and provides the hard disk drive 1024 with the programs or the data via the RAM 1014. The IC card drive reads programs and data from an IC card, and/or writes programs and data into the IC card.

The ROM 1030 stores therein a boot program or the like executed by the computer 1000 at the time of activation, and/or a program depending on the hardware of the computer 1000. The input/output chip 1040 may also connect various input/output units via a parallel port, a serial port, a keyboard port, a mouse port, and the like to the input/output controller 1020.

A program is provided by computer readable media such as the DVD-ROM 1001 or the IC card. The program is read from the computer readable media, installed into the hard disk drive 1024, RAM 1014, or ROM 1030, which are also examples of computer readable media, and executed by the CPU 1012. The information processing described in these programs is read into the computer 1000, resulting in cooperation between a program and the above-mentioned various types of hardware resources. An apparatus or method may be constituted by realizing the operation or processing of information in accordance with the usage of the computer 1000.

For example, when communication is performed between the computer 1000 and an external device, the CPU 1012 may execute a communication program loaded onto the RAM 1014 to instruct communication processing to the communication interface 1022, based on the processing described in the communication program. The communication interface 1022, under control of the CPU 1012, reads transmission data stored on a transmission buffering region provided in a recording medium such as the RAM 1014, the hard disk drive 1024, the DVD-ROM 1001, or the IC card, and transmits the read transmission data to network 1050 or writes reception data received from network 1050 to a reception buffering region or the like provided on the recording medium.

In addition, the CPU 1012 may cause all or a necessary portion of a file or a database to be read into the RAM 1014, the file or the database having been stored in an external recording medium such as the hard disk drive 1024, the DVD-ROM drive 1026 (DVD-ROM 1001), the IC card, etc., and perform various types of processing on the data on the RAM 1014. The CPU 1012 may then write back the processed data to the external recording medium.

Various types of information, such as various types of programs, data, tables, and databases, may be stored in the recording medium to undergo information processing. The CPU 1012 may perform various types of processing on the data read from the RAM 1014, which includes various types of operations, processing of information, condition judging, conditional branch, unconditional branch, search/replace of information, etc., as described throughout this disclosure and designated by an instruction sequence of programs, and writes the result back to the RAM 1014. In addition, the CPU 1012 may search for information in a file, a database, etc., in the recording medium. For example, when a plurality of entries, each having an attribute value of a first attribute is associated with an attribute value of a second attribute, are stored in the recording medium, the CPU 1012 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 1000. In addition, a recording medium such as a hard disk or a RAM provided in a server system connected to a dedicated communication network or the Internet can be used as the computer readable media, thereby providing the program to the computer 1000 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a flexible disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method comprising:
   determining whether to execute a target program on a single hardware thread or a plurality of hardware threads; and
   assigning one of a light-weight memory fence and a heavy-weight memory fence as a memory fence in the target program based on whether to execute the target program on the single hardware thread or the plurality of hardware threads, wherein at least one of the light-weight memory fence and the heavy-weight memory fence are configured to provide memory access based on visibility;
   wherein the light-weight memory fence is assigned in response to determining to execute the target program on the single hardware thread, and the heavy-weight memory fence is assigned in response to determining to execute the target program on the plurality of hardware threads.

2. The computer-implemented method of claim 1, wherein the light-weight memory fence is configured to guarantee that every memory access of a predetermined type preceding the light-weight memory fence in program order is locally visible in the single hardware thread before allowing any memory access of the predetermined type following the light-weight memory fence in program order.

3. The computer-implemented method of claim 1, wherein the heavy-weight memory fence is configured to guarantee that every memory access of a predetermined type preceding the heavy-weight memory fence in program order is globally visible in the plurality of hardware threads before allowing any memory access of the predetermined type following the heavy-weight memory fence in program order.

4. The computer-implemented method of claim 1, wherein the assigning the light-weight memory fence includes replacing a heavy-weight memory fence instruction in the target program with a light-weight memory fence instruction.

5. The computer-implemented method of claim 4, wherein the assigning the heavy-weight memory fence further includes restoring, after the target program is executed on the single hardware thread, the heavy-weight memory fence instruction in the target program in response to determining to execute the target program on a plurality of hardware threads.

6. The computer-implemented method of claim 4, wherein the assigning the light-weight memory fence includes replacing the heavy-weight memory fence instruction with a no operation in response to a condition that the processor executing the target program is configured to guarantee that every memory access of a predetermined type is locally visible in the single hardware thread before any subsequent memory accesses of the predetermined type in program order are performed.

7. The computer-implemented method of claim 1, further comprising inserting, to the target program, a code for conditionally executing the heavy-weight memory fence;
   wherein the assigning the heavy-weight memory fence includes setting a condition of the code to execute the heavy-weight memory fence.

8. The computer-implemented method of claim 1, further comprising:
   preparing a first version of the target program including the heavy-weight memory fence and a second version of the target program including the light-weight memory fence; and
   wherein the assigning the heavy-weight memory fence further includes specifying that the first version of the target program is selected to be executed, and
   the assigning the light-weight memory fence includes specifying that the second version of the target program is selected to be executed.

9. The computer-implemented method of claim 1, further comprising monitoring an execution workload of the target program;
   wherein the determining includes determining whether to execute the target program on the single hardware thread or the plurality of hardware threads based on the execution workload.

10. The computer-implemented method of claim 9, wherein the determining includes determining to execute the target program on the single hardware thread in response to the execution workload being lower than a first threshold, the first threshold not being more than a processing capacity of the single hardware thread.

11. The computer-implemented method of claim 10, wherein the determining includes determining to execute the target program on the plurality of hardware threads in response to the execution workload not being lower than a second threshold.

12. The computer-implemented method of claim 1, further comprising switching execution of the target program between execution on the single hardware thread and execution on the plurality of hardware threads during temporary suspension of execution of the target program.

13. The computer-implemented method of claim 12, wherein the temporary suspension of execution of the target program is caused by a garbage collection.

14. The computer-implemented method of claim 12, wherein the switching includes setting a processor affinity of software threads of the target program to the single hardware thread in response to determining to execute the target program on the single hardware thread.

15. A computer program product including one or more computer readable storage mediums correctively storing program instructions that are executable by a processor or programmable circuitry to cause the processor or programmable circuitry to perform operations comprising:
   determining whether to execute a target program on a single hardware thread or a plurality of hardware threads; and
   assigning one of a light-weight memory fence and a heavy-weight memory fence as a memory fence in the target program based on whether to execute the target program on the single hardware thread or the plurality of hardware threads, wherein at least one of the light-weight memory fence and the heavy-weight memory fence are configured to provide memory access based on visibility;
   wherein the light-weight memory fence is assigned in response to determining to execute the target program on the single hardware thread, and the heavy-weight memory fence is assigned in response to determining to execute the target program on the plurality of hardware threads.

16. The computer program product of claim 15, wherein the assigning the light-weight memory fence includes replacing a heavy-weight memory fence instruction in the target program with a light-weight memory fence instruction.

17. The computer program product of claim 15, wherein the operations further comprising monitoring an execution workload of the target program;
   wherein the determining includes determining whether to execute the target program on the single hardware thread or the plurality of hardware threads based on the execution workload.

18. An apparatus comprising:
   a processor or a programmable circuitry, and
   one or more computer readable mediums collectively including instructions that, when executed by the processor or the programmable circuitry, cause the processor or the programmable circuitry to:
   determine whether to execute a target program on a single hardware thread or a plurality of hardware threads; and
   assign one of a light-weight memory fence and a heavy-weight memory fence as a memory fence in the target program based on whether to execute the target program on the single hardware thread or the plurality of hardware threads, wherein at least one of the light-weight memory fence and the heavy-weight memory fence are configured to provide memory access based on visibility;
   wherein the light-weight memory fence is assigned in response to determining to execute the target program on the single hardware thread, and the heavy-weight memory fence is assigned in response to determining to execute the target program on the plurality of hardware threads.

19. The apparatus of claim 18, wherein the assigning the light-weight memory fence includes replacing a heavy-weight memory fence instruction in the target program with a light-weight memory fence instruction.

20. The apparatus of claim 18, wherein the instructions further causes the processor or the programmable circuitry to monitor an execution workload of the target program;
   wherein the determining includes determining whether to execute the target program on the single hardware thread or the plurality of hardware threads based on the execution workload.

* * * * *